D. W. PARKER.
STONE SAW.
APPLICATION FILED JUNE 28, 1918.

1,293,897.

Patented Feb. 11, 1919.

INVENTOR
Daniel W. Parker
BY
Pierre Barnes
ATTORNEY

UNITED STATES PATENT OFFICE.

DANIEL W. PARKER, OF EVERETT, WASHINGTON.

STONE-SAW.

1,293,897. Specification of Letters Patent. Patented Feb. 11, 1919.

Application filed June 28, 1918. Serial No. 242,353.

*To all whom it may concern:*

Be it known that I, DANIEL W. PARKER, a citizen of the United States, residing at Everett, in the county of Snohomish and State of Washington, have invented certain new and useful Improvements in Stone-Saws, of which the following is a specification.

This invention relates to stone cutting saws and more especially, to improvements to the saws of the class shown and described in patent application Serial No. 72,422 filed by me January 17, 1916.

The object of the present invention is the perfecting of stone saws of the circular type by the provision of detachable teeth constructed and arranged to most efficiently perform their duty and increase the strength and rigidity of the saw.

The invention consists in the novel form of saw-teeth, and in the peculiar manner or means for securing the same to the saw-body as will be hereinafter described and claimed.

Figure 1:
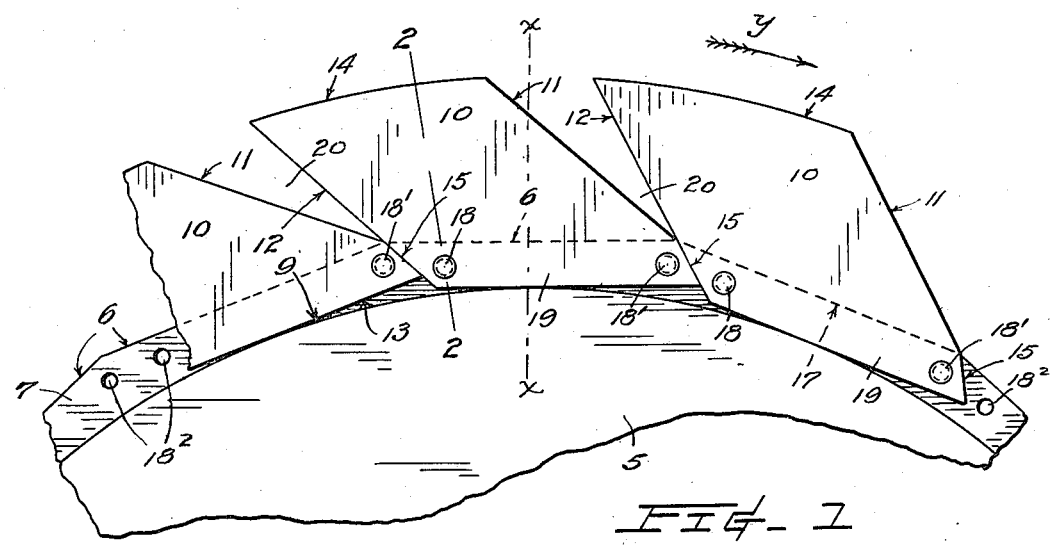
Figure 2:
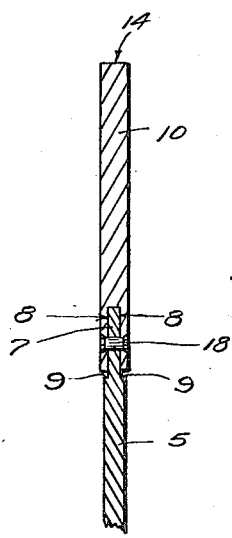
Figure 3:
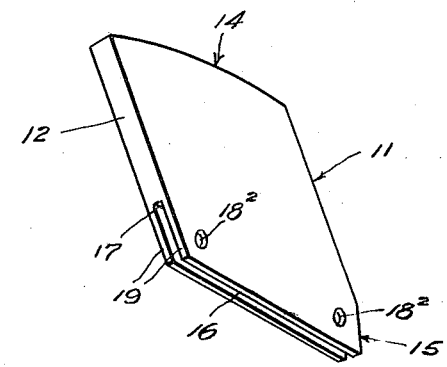

In the accompanying drawings,

Figure 1 is a side elevation of a portion of a saw embodying my invention; and Fig. 2 is a sectional view on the line 2—2 thereof. Fig. 3 is a perspective view of a saw-tooth shown detached.

The reference numeral 5 designates a saw-blade made from a circular plate to form a polygonal body having at its perimeter a plurality of faces 6 which serve as seats for the saw teeth. Adjacent to its periphery the blade is machined to provide a circumferential rib 7 of uniform thickness between two plane side faces 8 extending from shoulders 9 concentric to the blade axis.

Provided for each of the faces 6 is a saw-tooth 10 of greater thickness than the blade and of a substantially rhomboidal shape,—that is to say, with front and back edges 11 and 12 parallel but out of rectangular relations with the inner and outer edges 13 and 14. The outer edge 14 of a saw-tooth, is, however, desirably made to conform to an arc concentric to the saw axis when the tooth is applied.

The angle between the front and inner edges 11 and 13, respectively of a tooth is cut away to furnish an edge 15 arranged to be juxtaposed throughout its length with the rear edge 12 of the saw tooth next in front.

A saw tooth is provided at its inner side with a longitudinal groove 16 of a width to fit over the blade rib 7 and of a depth, preferably, equal to the width of the rib radially of the blade. The bottom 17 of a tooth groove is made straight to seat against a blade face 6 the entire length of the same. The teeth are secured to the blade by rivets 18 and 18¹ passing through registering holes 18² provided in the plate rib 7 and the bifurcations 19 of the teeth, said rivets being headed (Fig. 2) in conoidal outer ends of the tooth holes so that the extremities of said rivets will be flush or in a plane with the side surfaces of the respective teeth. To remove a saw tooth, the rivet heads on one side of the tooth are cut away, so that the rivets may be punched out toward the opposite side.

By constructing and assembling the teeth as above described there is provided a V-shaped notch 20 between the adjacent teeth with the front and rear edges 11 and 12, respectively, in angular relation to a line, as *x—x* radially of the saw.

In operation, steel shot is utilized as the abrading element which as the saw rotates in the direction indicated by arrow *y*, is caused by the slope of the front edges 11 to be wedged outwardly to be engaged between the outer tooth-edges 14 and the bottom and front of the kerf in which the saw operates. By reason of the teeth revolving in the direction of arrow *y* the strains encountered thereby will tend to tilt the teeth as about the axes of the rearmost rivets 18, which tilting is restrained by the bearing of the front edges 15 against the rear edges 12 of the adjacent teeth, thereby relieving the rivets 18¹ of shearing stresses.

By making the teeth thicker than the blade, ample clearance is afforded, and the blade rim is strengthened by the bifurcations of the teeth riveted thereto in abutting relations throughout the circumference of the blade.

What I claim, is—

1. In a circular stone-saw, a saw blade and a plurality of bifurcated rhomboidal shaped teeth having an arcuate outer edge and of greater thickness than the blade, said teeth being connected to the blade by straddling the rim thereof and are rigidly secured thereto by rivets so that the outer edges of the respective teeth will be disposed concentrically of the blade axis.

2. In a circular stone-saw, the combination with the saw blade, of a plurality of bifurcated teeth engaging the blade and in abutting relations with each other, the front and rear edges of each tooth being substantially parallel and inclined with respect to radial lines projected from the axis of the saw's rotation, the outer edge of a tooth being formed to an arc concentric to said axis, and means extending through the teeth and the blade for securing the same together.

3. In a circular stone-saw, a saw blade, an attachable tooth having parallel rearwardly inclined front and rear edges and an arcuate outer edge, said tooth being of a thickness greater than that of the blade, and fastening means for connecting the tooth to the blade so that its arcuate edge will coincide with a circle concentric to the axis of the blade, said tooth being formed at its forward side with a face adapted to abut against the rear edge of the tooth thereinfront circumferentially of the blade whereby the teeth mutually contribute with said fastening means for securing a plurality of adjacent teeth to the blade.

4. A stone-saw, comprising a blade, a plurality of teeth of greater thickness than the blade and bifurcated to straddle the periphery of the blade, said teeth being of substantially rhomboidal shapes with the front and rear edges thereof inclined from directions radial of the saw and arranged to have the forward end of the inner part of each of the teeth engage against the rearwardly inclined rear edge of the tooth next in front, and rivets extending through holes provided in the saw blade and the bifurcations of the teeth for securing the latter to the blade.

5. A stone saw comprising a polygonal blade having a peripheral portion of reduced thickness, a plurality of teeth of greater thickness than the blade and bifurcated to straddle said peripheral portion of the blade and fit against the respective sides of the blade, said teeth being of substantially rhomboidal shapes with the front and rear edges thereof inclined from directions radial of the saw and arranged to have the forward end of the part of each of the teeth engage against the rearwardly inclined rear edge of the tooth next in front, and rivets extending through holes provided in the saw blade and the bifurcations of the teeth for securing the latter to the blade.

6. In a circular stone saw, the combination with a polygonal saw blade, of a plurality of rhomboidal teeth grooved at their inner edges to straddle the peripheral portion of the blade and seat against one of the sides of the blade, said teeth being of lengths circumferential of the blade to be in juxtaposition one with another, and means extending through the bifurcations of the teeth and the blade for securing the same together.

Signed at Seattle, Washington, this 15th day of June, 1918.

DANIEL W. PARKER.

Witnesses:
O. B. WHITNEY,
L. H. WRIGHT.